US009632761B2

(12) United States Patent
Pechanec et al.

(10) Patent No.: US 9,632,761 B2
(45) Date of Patent: Apr. 25, 2017

(54) DISTRIBUTE WORKLOAD OF AN APPLICATION TO A GRAPHICS PROCESSING UNIT

(71) Applicant: Red Hat, Inc., Raleigh, NC (US)

(72) Inventors: Jiri Pechanec, Mokra-Horakov (CZ); Martin Vecera, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 120 days.

(21) Appl. No.: 14/153,239

(22) Filed: Jan. 13, 2014

(65) Prior Publication Data

US 2015/0199787 A1 Jul. 16, 2015

(51) Int. Cl.
*G06F 9/45* (2006.01)
*G06F 9/50* (2006.01)

(52) U.S. Cl.
CPC .......... *G06F 8/451* (2013.01); *G06F 9/5044* (2013.01); *G06F 2209/509* (2013.01)

(58) Field of Classification Search
None
See application file for complete search history.

(56) References Cited

U.S. PATENT DOCUMENTS

| | | | | |
|---|---|---|---|---|
| 7,580,040 | B2* | 8/2009 | Huang et al. | 345/522 |
| 8,154,554 | B1* | 4/2012 | Brown et al. | 345/522 |
| 8,373,710 | B1* | 2/2013 | Vij et al. | 345/502 |
| 8,495,602 | B2* | 7/2013 | Chen et al. | 717/149 |
| 8,756,590 | B2* | 6/2014 | Zhu et al. | 717/149 |
| 8,762,366 | B1* | 6/2014 | Becerra et al. | 707/713 |
| 2004/0237074 | A1* | 11/2004 | Aronson et al. | 717/158 |
| 2006/0170680 | A1* | 8/2006 | Peeper et al. | 345/426 |
| 2008/0109795 | A1* | 5/2008 | Buck | G06F 8/443 717/137 |
| 2008/0276220 | A1* | 11/2008 | Munshi et al. | 717/119 |
| 2008/0276261 | A1* | 11/2008 | Munshi et al. | 719/328 |
| 2008/0276262 | A1* | 11/2008 | Munshi et al. | 719/328 |

(Continued)

FOREIGN PATENT DOCUMENTS

CN 102541640 A 7/2012

OTHER PUBLICATIONS

Lei Wang et al., Task Scheduling of Parallel Processing in CPU-GPU Collaborative Environment, International Conference on Computer Science and Information Technology 2008, pp. 228-232, © 2008 IEEE.

(Continued)

*Primary Examiner* — Isaac T Tecklu
(74) *Attorney, Agent, or Firm* — Haynes and Boone, LLP

(57) ABSTRACT

Systems, methods, and techniques of distributing a workload of an application to a GPU are provided. An example method includes obtaining an intermediate representation of a source code portion of an application and compiling the intermediate representation into a set of instructions that is native to the GPU. The set of instructions includes a binary representation of the source code portion executable on the GPU, and execution of the set of instructions on the GPU includes processing a workload of the application. The method also includes transforming data associated with the source code portion into one or more data types native to the GPU and sending to the GPU a communication including the set of instructions executable on the GPU and the one or more data types native to the GPU.

20 Claims, 3 Drawing Sheets

(56) References Cited

U.S. PATENT DOCUMENTS

| | | | |
|---|---|---|---|
| 2009/0141034 A1* | 6/2009 | Pryor et al. | 345/522 |
| 2009/0307699 A1* | 12/2009 | Munshi et al. | 718/102 |
| 2010/0153934 A1* | 6/2010 | Lachner | 717/146 |
| 2010/0156888 A1* | 6/2010 | Luk et al. | 345/418 |
| 2011/0212761 A1* | 9/2011 | Paulsen et al. | 463/25 |
| 2012/0066668 A1* | 3/2012 | Buck | G06F 8/443 717/149 |
| 2012/0069029 A1* | 3/2012 | Bourd et al. | 345/502 |
| 2013/0036409 A1* | 2/2013 | Auerbach et al. | 717/140 |
| 2013/0050229 A1* | 2/2013 | Song et al. | 345/502 |
| 2013/0061240 A1* | 3/2013 | Yan | G06F 9/547 719/312 |
| 2013/0107289 A1* | 5/2013 | Brodzinski et al. | 358/1.9 |
| 2013/0132684 A1* | 5/2013 | Ostrovsky et al. | 711/147 |
| 2013/0141443 A1* | 6/2013 | Schmit et al. | 345/505 |
| 2013/0155080 A1* | 6/2013 | Nordlund et al. | 345/522 |
| 2013/0159680 A1* | 6/2013 | Chen et al. | 712/222 |
| 2014/0333638 A1* | 11/2014 | Kaminski et al. | 345/522 |
| 2014/0347371 A1* | 11/2014 | Stenson et al. | 345/501 |
| 2014/0347375 A1* | 11/2014 | Stenson et al. | 345/522 |
| 2015/0095277 A1* | 4/2015 | Tristan et al. | 706/52 |
| 2015/0095896 A1* | 4/2015 | Jiang et al. | 717/158 |

OTHER PUBLICATIONS

What is Aparapi?, Aparapi API for Data Parallel Java. retrieved on Jan. 10, 2014 from https://code.google.com/p/aparapi/; 2 pages, Allows Suitable Code to be Executed on GPU via OpenCI.

Gary Frost, I Don't Always Write GPU Code in Java but When I Do I like to Use Aparapi, An Open Source API for Expressing Data Parallel Workloads in Java; retrieved on Mar. 13, 2014 from http://developer.amd.com/community/blog/2011/09/14/i-dont-always-write-gpu-code-in-java-but-when-i-do-i-like-to-use-aparapi/, pp. 1-7.

Rootbeer, GitHub, retrieved on Mar. 13, 2014 from https://github.com/pcpratts/rootbeer1, pp. 1-4, © 2014 Github, Inc.

Augonnet, C. et al. (2011), StarPU: a unified platform for task scheduling on heterogeneous multicore architectures. Concurrency Computat.: Pract. Exper., 23: 187-198. doi: 10.1002/cpe.1631, retrieved on Jan. 10, 2014 from http://onlinelibrary.wiley.com/doi/10.1002/cpe.1631/full; © 2010 John Wiley & Sons, Ltd.

* cited by examiner

DISTRIBUTE WORKLOAD OF AN APPLICATION TO A GRAPHICS PROCESSING UNIT

BACKGROUND

The present disclosure generally relates to computing devices, and more particularly to distributing a workload of an application.

A computation may be performed on one or more computing devices. Certain computations (e.g., parallel processing or parallel programming) may benefit from using processing units of the computing device. For example, a complex computation may run faster if the computation is divided into portions and the portions are run on a number of processing units. Graphics processing units (GPUs) are leading the trend for performing computationally intensive tasks for applications.

BRIEF SUMMARY

It may be desirable to parallelize computations, especially when working with complex data and large data sets. This disclosure relates to distributing a workload of an application for execution on a graphics processing unit (GPU). Methods, systems, and techniques for distributing the workload to one or more GPU(s) and/or to one or more GPU core(s) are provided.

According to an embodiment, a system for distributing a workload of an application to a graphics processing unit (GPU) includes a computing device coupled to a plurality of processing units. The plurality of processing units includes a central processing unit (CPU) and a GPU. Each of the CPU and GPU executes a workload of an application. The system also includes a scheduler that obtains an intermediate representation of a source code portion of the application. The scheduler transforms data associated with the source code portion into one or more data types native to the GPU. The system further includes a compiler that compiles the intermediate representation into a set of instructions that is native to the GPU. The set of instructions includes a binary representation of the source code portion executable on the GPU. Execution of the set of instructions on the GPU includes processing a workload of the application. The CPU sends to the GPU the set of instructions executable on the GPU and the one or more data types native to the GPU. The communication causes the GPU to execute the set of instructions using the one or more data types native to the GPU.

According to another embodiment, a method of distributing a workload of an application to a GPU includes obtaining an intermediate representation of a source code portion of an application. The method also includes compiling the intermediate representation into a set of instructions that is native to the GPU. The set of instructions includes a binary representation of the source code portion executable on the GPU. Execution of the set of instructions on the GPU includes processing a workload of the application. The method further includes transforming data associated with the source code portion into one or more data types native to the GPU. The method also includes sending to the GPU a communication including the set of instructions executable on the GPU and the one or more data types native to the GPU. The communication causes the GPU to execute the set of instructions using the one or more data types native to the GPU.

According to another embodiment, a non-transitory machine-readable medium includes a plurality of machine-readable instructions that when executed by one or more processors are adapted to cause the one or more processors to perform a method including: obtaining an intermediate representation of a source code portion of an application; compiling the intermediate representation into a set of instructions that is native to the GPU, where the set of instructions includes a binary representation of the source code portion executable on the GPU, and where execution of the set of instructions on the GPU includes processing a workload of the application; transforming data associated with the source code portion into one or more data types native to the GPU; and sending to the GPU a communication including the set of instructions executable on the GPU and the one or more data types native to the GPU, where the communication causes the GPU to execute the set of instructions using the one or more data types native to the GPU.

BRIEF DESCRIPTION OF THE DRAWINGS

The accompanying drawings, which form a part of the specification, illustrate embodiments of the invention and together with the description, further serve to explain the principles of the embodiments. It should be appreciated that like reference numerals may be used to identify like elements or similarly functioning elements illustrated in one or more of the figures. The drawing in which an element first appears is generally indicated by the left-most digit in the corresponding reference number.

DETAILED DESCRIPTION

I. Overview
II. Example System Architecture
  A. Intermediate Representation
  B. Native Code For Execution on GPU
    1. Schedule the Execution of a Thread
    2. Compile Intermediate Representation into Code Native to GPU
    3. Transform Data Specific to the Application into Data Native to GPU
    4. Execute the Code Using Data Types Native to GPU on GPU
  C. Output from GPU
III. Example Method
IV. Example Computing System

I. Overview

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

It may be advantageous to distribute the workload of an application across multiple processing units. A computing device may be equipped with one or more high-performance GPUs that provides high performance with regard to computations. The GPU may be equipped with one or more GPU cores. It may be advantageous to enable an application to harness the power of a GPU to perform computations.

In an embodiment, a system for distributing a workload of an application to a GPU includes a computing device coupled to a plurality of processing units. The plurality of processing units includes a central processing unit (CPU) and a GPU. Each of the CPU and GPU executes a workload of an application. The system also includes a scheduler that obtains an intermediate representation of a source code portion of the application. The scheduler transforms data associated with the source code portion into one or more data types native to the GPU. The system further includes a compiler that compiles the intermediate representation into a set of instructions that is native to the GPU. The set of instructions includes a binary representation of the source code portion executable on the GPU. Execution of the set of instructions on the GPU includes processing a workload of the application. The CPU sends to the GPU the set of instructions executable on the GPU and the one or more data types native to the GPU. The communication causes the GPU to execute the set of instructions using the one or more data types native to the GPU.

II. Example System Architecture

Figure 1:
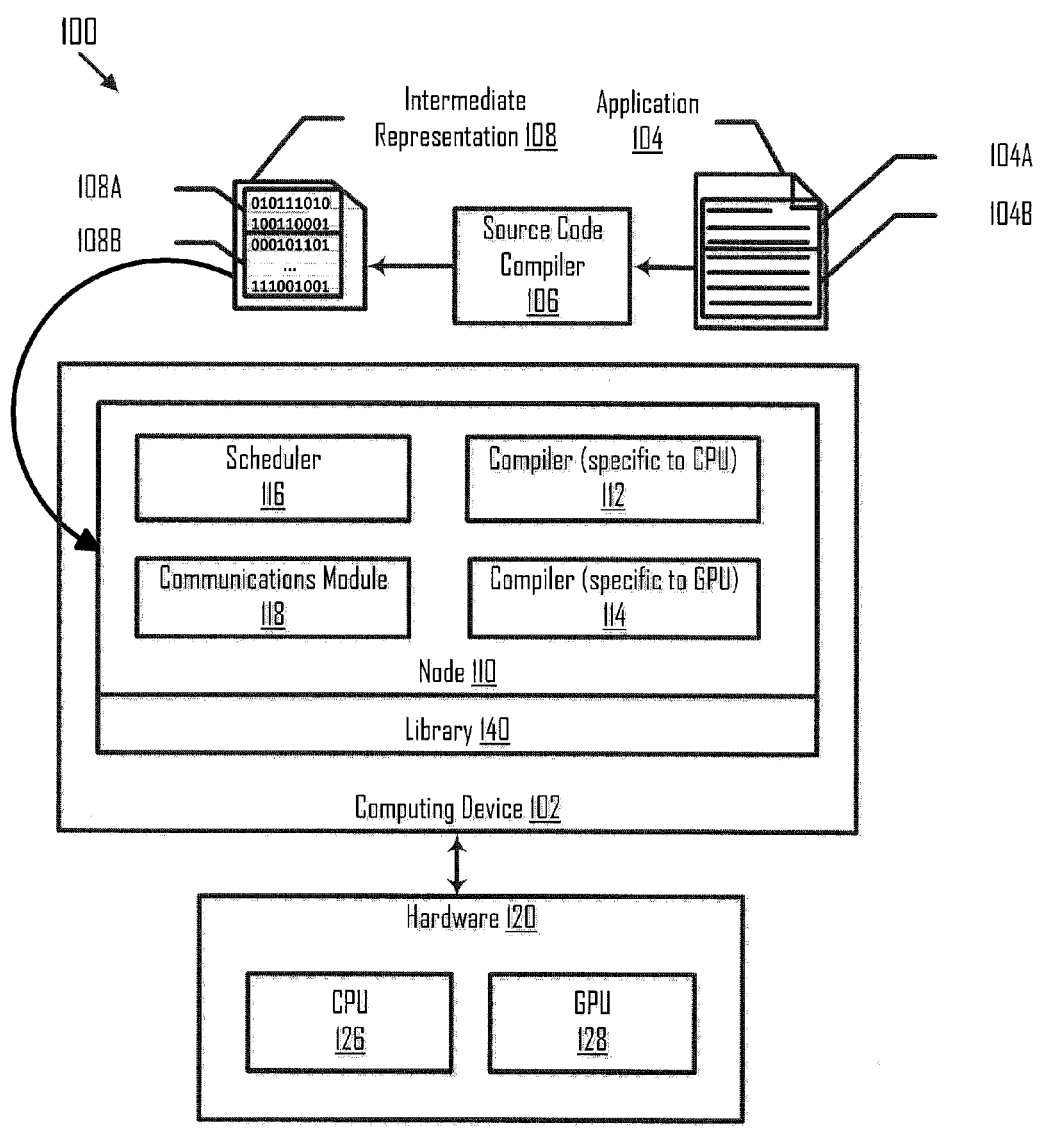
FIG. 1 is a simplified block diagram illustrating a system for distributing a workload of an application to a GPU, according to an embodiment.

FIG. 1 is a simplified block diagram 100 illustrating a system for distributing a workload of an application to a graphics processing unit (GPU), according to an embodiment. In FIG. 1, computing device 102 may run an application 104 that is written in a high-level programming language. In an example, application 104 is a source code program that is not directly compiled into native code that runs on a specific hardware platform. Rather, application 104 is compiled into an intermediate representation 108, which is compiled into native code that runs on the specific hardware platform.

Although an application may be described as being compiled once into an intermediate representation, which is then compiled into code that is native to a GPU, it should be understood that other embodiments in which the intermediate representation is compiled into another intermediate representation multiple times before being compiled into code that is native to the GPU are within the scope of the disclosure. For example, application 104 may be compiled into a first intermediate representation, which is compiled into a second intermediate representation (which may be further compiled into another intermediate representation), which is finally compiled into code that is native to a GPU and executable on the GPU.

Computing device 102 is coupled to hardware 120, which includes a plurality of processing units. The plurality of processing units includes a CPU 126 and a GPU 128. Although one CPU and one GPU are illustrated, other embodiments including more than one CPU and/or more than one GPU are within the scope of the present disclosure. Further, each CPU may include one or more CPU cores, and each GPU may include one or more GPU cores. In an example, a GPU may include multiple processing cores that share memory. In such an example, each GPU core may have its own L1 cache, and the L2 cache may be common to all GPU cores, which connect to the L2 cache via a shared bus.

A. Intermediate Representation

Computing device 102 includes a node 110 that is a software program that runs and communicates with applications. Node 110 runs application 104 and may be an operating system or a virtual machine running on a computing device. A virtual machine is a software implementation of a machine that may execute programs. In an example, the virtual machine may be a JAVA® virtual machine (JVM). Trademarks are the property of their respective owners.

In FIG. 1, a source code compiler 106 compiles application 104 into an intermediate representation 108 that may be distributed to different nodes (e.g., node 110). Node 110 provides the runtime environment for intermediate representation 108. Intermediate representation 108 may be machine-independent binary code that is not directly executable on a computing device. In an example, the output of source code compiler 106 is not executable code. In such an example, intermediate representation may represent an instruction set for a CPU or GPU that does not exist in reality. Intermediate representation 108 may be compiled into instructions that are native to and directly executed by computing device 102.

Compilation of the source code program into an intermediate representation that is machine independent may be advantageous because the source code program may be portable and used on various hardware platforms. As such, distribution of the intermediate representation may make it easier to run a program (e.g., application 104) in a wide variety of environments because any platform that implements node 110 may run the program. The intermediate representation may be a highly optimized set of instructions designed to be executed by node 110. Further, issues with application security may be reduced because the application is executed by node 110. For example, node 110 may prevent the program from generating side effects outside of the runtime environment and that spill over into the rest of the system.

The present disclosure provides techniques to extend the concept of parallel execution of an application to distributing a workload of the application to a GPU. A task that can be split into multiple workloads can be divided and executed in parallel on multiple processing units, thus increasing the program throughput. It should be understood that a processing unit may refer to CPU, a CPU core, a GPU, or a GPU core. The design of a CPU is optimized for sequential code performance and makes use of sophisticated logic to allow instructions from a single thread of execution to execute in parallel or even out of their sequential order while maintaining the appearance of sequential execution. In contrast, the design of a GPU is optimized for computations and typically has a highly parallel structure. In an example, the GPU may perform a massive number of floating-point calculations multiple times faster than a CPU. One or more GPUs and/or GPU core(s) may execute a workload of an application in parallel. In an example, application 104 computes prime numbers, and the application developer splits up the calculation of prime numbers such that a file includes lines that each perform some work of the computation and may be processed by separate CPU(s), CPU core(s), GPU(s), and/or GPU core(s). Some work of the computation may be performed concurrently on the CPU(s), CPU core(s), GPU(s) and/or GPU core(s).

Application 104 may include indications that one or more particular portions of the source code should be sent to the GPU for processing. In an example, application 104 includes an annotation that specifies a source code portion of application 104 that is executable on a GPU. In the example illustrated in FIG. 1, application 104 includes a first source code portion 104A and a second source code portion 104B. A binary representation of first source code portion 104A may be executed on CPU 126, and a binary representation of second source code portion 104B may be executed on GPU 128. In particular, second source code portion 104B may be "marked" by the application developer, who determines that it may be advantageous to execute second source code portion 104B on a GPU rather than a CPU.

In an example, the application developer uses metadata (e.g., an annotation) associated with a class to mark it as executable on a GPU. Table A at line 1 illustrates an example Java annotation in a Java class definition indicating that the class is executable on a GPU.

TABLE A

```
@GPUExecutable            //line 1
public class Computation {
    public int power (int x) {
        return Math.pow(x, x);}}
```

Table A illustrates an example class definition of a Computation class. The class definition of the Computation class defines the particular class and includes at line 1 an annotation "@GPUExecutable" indicating that the particular class (e.g., Computation class) is executable on a GPU. The Computation class is a public class that computes a power of a number. The class may contain one or more methods that is executable on the GPU.

Node 110 may include an annotation processor (not shown) that processes annotations. The annotation processor may be, for example, a compiler plug-in. The annotation processor may recognize the annotation "@GPUExecutable" as being an indication that the Computation class is executable on a GPU. Other ways to indicate a class as being executable on a GPU are within the scope of the disclosure. In an example, node 110 has a list that includes classes that are executable on a GPU. When node 110 executes the intermediate representation of application 104, node 110 may determine whether the particular class is executable on a GPU by checking the list.

Node 110 obtains intermediate representation 108 of application 104. Intermediate representation 108 includes a first intermediate representation 108A and a second intermediate representation 108B. First intermediate representation 108A is an intermediate representation of first source code portion 104A, and second intermediate representation 108B is an intermediate representation of second source code portion 104B. In an example, node 110 obtains intermediate representations 108A and 108B from the same file. In another example, node 110 obtains intermediate representations 108A and 108B from different files that are received at different times.

In an example, application 104 is a Java application that is written in the Java programming language, intermediate representation 108 is Java bytecode, and node 110 is a JVM. In such an example, source code compiler 106 compiles the Java application into Java bytecode, which is converted to code that is executable on a GPU. Although the present disclosure may describe the application as being a Java application, intermediate representation 108 as being Java bytecode, and/or node 110 as being a JVM, it should be understood that the techniques in the disclosure apply to any application (a portion or all) that is compiled into an intermediate representation and may benefit from the techniques provided in the disclosure. For example, an application that is written in ColdFusion, JRuby, Jython, Groovy, and Scala may be compiled into an intermediate representation and may benefit from the techniques provided in the disclosure.

B. Native Code for Execution on GPU

Node 110 may have its own implementation of the threading model, depending on its vendor and the platform for which it is written. In an example, a thread is an abstraction within node 110. In such an example, the operating system executing (not shown) in computing device 102 does not know anything about the threads that exist in node 110. For example, from the perspective of the operating system, node 110 may be a single process and a single thread.

1. Schedule the Execution of a Thread

Node 110 includes a scheduler 116 and communications module 118. Scheduler 116 schedules code to be run on the CPU and/or GPU. Scheduler 116 may create a CPU thread that executes on the CPU and may create a GPU thread that executes on the GPU. In an embodiment, scheduler 116 schedules the execution of threads on the CPU and/or GPU. Node 110 may create a thread and hold all of its information related to the thread within the thread object itself. Such information may include the thread's stack, a program counter to track the currently executing instruction, and other data. Scheduler 116 may schedule the concurrent execution of one or more CPU threads and/or one or more GPU threads. Scheduler 116 may use a parallel application programming interface (API) that is available via the Java Development Kit (MK). For example, scheduler 116 may make API calls to schedule the concurrent execution of a plurality of threads.

In an example, scheduler 116 schedules one or more CPU threads to execute in parallel with one or more GPU threads. In such an example, application 104 is executing on computing device 102 in parallel with a workload of application 104 being executed on GPU 128. In another example, scheduler 116 schedules GPU threads to execute on a first GPU and a second GPU in parallel. In another example, scheduler 116 schedules GPU threads to execute on multiple GPU cores of GPU 128 in parallel.

Allowing one or more CPU threads and/or one or more GPU threads to run concurrently may eliminate or greatly reduce user observable pause times. A CPU thread and GPU thread run concurrently when execution of the CPU thread and the GPU thread has some overlap. In an example, a time period in which CPU 126 executes a first set of instructions may overlap with a time period in which GPU 128 executes a second set of instructions. For example, a CPU thread may run on CPU 126 during a period of time in which a GPU thread is running on GPU 128. In another example, a CPU thread may start running on CPU 126 and stop before completion, a GPU thread may start running on GPU 128 and stop before completion, and the CPU thread may resume running on CPU 126 and finish. In another example, a GPU thread may start running on GPU 128 and stop before completion, a CPU thread may start running on CPU 126 and stop before completion, and the GPU thread may resume running on GPU 128 and finish.

Similarly, GPU threads may run concurrently when execution of a first GPU thread and a second GPU thread has some overlap. In an example, a time period in which a first GPU core of GPU 128 executes a first set of instructions may overlap with a time period in which a second core of GPU 128 executes a second set of instructions. For example, a first GPU thread may run on the first core of GPU 128 during a period of time in which a second GPU thread is running on the second core of GPU 128. In another example, a first GPU thread may start running on the first core of GPU 128 and stop before completion, a second GPU thread may start running on the second core of GPU 128 and stop before completion, and the first GPU thread may resume running on the first core of GPU 128 and finish.

2. Compile Intermediate Representation into Code Native to GPU

Node 110 includes a compiler (specific to CPU) 112 that compiles intermediate representation 108A into a first set of instructions that is native to CPU 126. The first set of instructions includes a binary representation of source code portion 104A executable on CPU 126. The first set of instructions may be directly executed on CPU 126. Node 110 also includes a compiler (specific to GPU) 114 that compiles intermediate representation 108B into a second set of instructions that is native to GPU 128. The second set of instructions includes a binary representation of source code portion 104B executable on GPU 128. The second set of instructions may be directly executed on GPU 128, and execution of the second set of instructions on GPU 128 includes processing a workload of application 104. In an example, the instruction sets of CPU 126 and GPU 128 are different.

The following is a description of a compiler that is specific to a GPU. This description may apply as well to a compiler that is specific to a CPU. Compiler (specific to GPU) 114 is specific to GPU 128, and native code may refer to code that is created to run directly only on the type of GPU for which the compiler is designed. For example, any GPU may be used to process a workload of an application as long as a compiler that is specific to the particular GPU is used to compile the intermediate representation into code that is native to the GPU. Node 110 may include one or more compilers specific to one or more GPUs.

A compiler that is specific to a GPU is dependent on the architecture of the GPU. For example, GPUs that are provided by different vendors may have different instruction sets and different compilers may be specific to each of the GPUs. In an example, node 110 is a JVM and GPU 128 is based on an ARM instruction set architecture that enables the JVM to execute Java bytecode. Traditionally JVMs may easily run on the ARM architecture. In another example, node 110 is a JVM and GPU 128 is based on an instruction set architecture that is different from the ARM instruction set architecture. In such an example, compiler (specific to GPU) 114 may be a special compiler that compiles intermediate representation 108B to a code that is executable on the particular GPU.

Compiling intermediate representation 108B into a set of instructions includes generating a stream of commands for execution on GPU 128. CPU 126 may generate a stream of commands including the set of instructions for execution on GPU 128 and send the stream of commands to GPU 128. The intermediate representation may be compiled into the set of instruction all at once before application 104 begins executing on computing device 102 or may be compiled on-the-fly. In an example, before application 104 executes on computing device 104, compiler (specific to GPU) 114 compiles intermediate representation 108B into the binary representation of the source code portion executable on GPU 128. In another example, while application 104 is executing on computing device 102, compiler (specific to GPU) 114 compiles intermediate representation 108B into the binary representation of the source code portion executable on GPU 128.

3. Transform Data Specific to the Application into Data Native to GPU

The data types used in application 104 may be different from data types understood by GPU 128. In an embodiment, scheduler 116 transforms data associated with source code portion 104B into one or more data types native to GPU 128. In an example, scheduler 116 transforms data associated with source code portion 104B into one or more data types native to GPU 128.

Application 104 may be written in a high-level programming language, and the data associated with the source code portion may include data including one or more data types specific to the high-level programming language. In an example, application 104 is a Java application, and the data associated with the source code portion includes first data including one or more data types specific to Java. A data type specific to Java may be a Java primitive type (e.g., long or int). Scheduler 116 may transform a Java primitive type into a binary representation of a data type that is native to GPU 128. Java is an object-oriented programming language that defines classes. A data object may be a self-contained entity that has state and behavior and represents an instance of a class. The data object's state may be described as its fields and properties, and the data object's behavior may be described by its methods and events. Application 104 may include code that creates instances of a class, and an instance of a particular class may expose methods and properties defined by that class.

In an embodiment, transformation between data that are specific to Java and data that are specific to the GPU may be done via a library 140. Library 140 may be part of the memory space for node 110. Scheduler 116 obtains the first data including one or more data types specific to Java. Scheduler 116 may transform the first data into second data including one or more data types native to GPU 128 by passing the first data to library 140. In an example, library 140 is a Java library that accepts as parameters a Java data object and converts the data object to an object that is native to GPU 128. Responsive to passing the first data to library 140, scheduler 116 may obtain the second data including the one or more data types native to GPU 128. A data type in the first data corresponds to a data type in the second data. Additionally, the data representation may be different for each GPU (e.g., different implementation of floating point numbers). Accordingly, library 140 may be a library that is written for a particular GPU. As such, if two GPUs having different data representations are used, node 110 may include a library specific to the data representation of the first GPU and a different library specific to the data representation of the second GPU.

As discussed, the intermediate representation may be compiled into the set of instruction all at once before application 104 begins executing on computing device 102 or may be compiled on-the-fly. If compiler (specific to GPU) 114 compiles intermediate representation 108B into the binary representation of the source code portion executable on GPU 128 before application 104 executes on computing device 104, scheduler 116 may load the compiled binary representation and send this binary representation to GPU 128 for execution. GPU 128 may then execute the compiled binary representation. If compiler (specific to GPU) 114 compiles intermediate representation 108B into the binary representation of the source code portion executable on GPU 128 while application 104 is executing on computing device 102, scheduler 116 may access compiler (specific to GPU) 114 to request that it compile intermediate representation 108B to a set of instructions that is native to GPU 128. In an example, after application 140 starts executing on computing device 102, compiler (specific to GPU) 114 compiles intermediate representation 108B into the binary representation of the source code portion executable on GPU 128. Scheduler 116 may access library 140 via an API call including the data associated with the source code portion. Responsive to the API call, scheduler 116 may receive the one or more data types native to GPU 128, where a data type that is specific to the high-level programming language and included in the API call corresponds to one or more data types native to GPU 128.

4. Execute the Code Using the Data Types Native to GPU on GPU

Scheduler 116 schedules the set of instructions to be run on GPU 128 and interacts with communications module 118 to send to GPU 128 a communication including the set of instructions executable on GPU 128 along with the transformed data native to GPU 128. The data transformation may be performed when scheduler 116 passes the data to GPU 128. In an example, GPU 128 is a single instruction, multiple data (SIMD) processor and scheduler 116 "reuses" the set of instructions executable on GPU 128. In an example, scheduler 116 sends to GPU 128 the set of instructions native to GPU 128 and sends to a first core of GPU 128 a first set of data native to GPU 128 and sends to a second core of GPU 128 a second set of data native to GPU 128. Accordingly, different sets of data may be executed by different GPU cores of GPU 128 while using the same set of instructions.

In an embodiment, communications module 118 communicates with a graphics card including GPU 128 and sends a communication to the graphics card that causes GPU 128 to execute code. Communications module 118 may send to GPU 128 a communication including the set of instructions executable on GPU 128 and the one or more data types native to GPU 128. The communication causes GPU 128 to execute the set of instructions using the one or more data types native to the GPU. The set of instructions and the one or more data types native to GPU 128 is represented in a binary format including, for example, parameters, intended for consumption by GPU 128.

Although computing device 102 is illustrated as including one GPU, this is not intended to be limiting and other embodiments in which the computing device includes a plurality of GPUs are within the scope of the disclosure. In an example, computing device 102 includes a first GPU and a second GPU. Scheduler 116 may transform the data associated with second source code portion 104B and a third source code portion (not shown) of application 104 into one or more data types native to the first and second GPUs, respectively. The data may include a first set of data and a second set of data, where each of the first and second sets of data includes one or more data types specific to Java. Transforming the data may include transforming the one or more data types of the first set of data into one or more data types native to the first GPU and transforming the one or more data types of the second set of data into one or more data types native to the second GPU. As discussed, scheduler 116 may use a library (e.g., library 140) to obtain the one or more data types native to the first GPU and the one or more data types native to the second GPU. Compiler (specific to GPU) 114 may compile second source code portion 104B into a first set of instructions and may compile the third source code portion into a second set of instructions.

A communication including the first set of instructions native to the first GPU along with the one or more transformed data types native to the first GPU may be sent to the first GPU, and a communication including the second set of instructions native to the second GPU along with one or more transformed data types native to the second GPU may be sent to the second GPU. The first GPU may execute the first set of instructions using the one or more transformed data types native to the first GPU in parallel with the second GPU executing the second set of instructions using the one or more transformed data types native to the second GPU. Additionally, the first and second sets of instructions executed by the first and second GPUs may be the same or may be different.

In another example, GPU 128 of computing device 102 includes a first GPU core and a second GPU core. Scheduler 116 may transform the data associated with second source code portion 104B and a third source code portion (not shown) of application 104 into one or more data types native to the first and second GPU cores, respectively. The data include a first set of data and a second set of data, where each of the first and second sets of data includes one or more data types specific to the application. Transforming the data may include transforming the one or more data types of the first set of data into one or more data types native to the GPU and transforming the one or more data types of the second set of data into one or more data types native to the GPU. As discussed, scheduler 116 may use library 140 to obtain the one or more data types native to the GPU. Compiler (specific to GPU) 114 may compile second source code portion 104B into a first set of instructions and may compile the third source code portion into a second set of instructions.

A communication including the first set of instructions native to the GPU along with the one or more transformed data types native to the GPU may be sent to the first GPU core, and a communication including the second set of instructions native to the GPU along with one or more transformed data types native to the GPU may be sent to the second GPU core. The first GPU core may execute the first set of instructions using the one or more transformed data types native to the GPU in parallel with the second GPU core executing the second set of instructions using the one or more transformed data types native to the GPU. Additionally, the first and second sets of instructions executed by the first and second GPU cores may be the same or may be different.

C. Output From GPU

Each of the GPUs may receive the communication including the set of instructions executable on the GPU and the one or more data types native to the GPU and execute the set of instructions using the one or more data types native to the GPU to determine one or more results. In an example, GPU 128 receives the communication including the set of instructions executable on GPU 128 and the one or more data types native to GPU 128. Responsive to the communication, GPU 128 may execute the set of instructions using the one or more data types native to GPU 128 to determine one or more results.

Communications module 118 may receive a response to the communication, where the response includes a result of the GPU-processed workload (e.g., from each of the GPUs). In an example, the result includes third data including one or more data types native to GPU 128. In keeping with the above example, scheduler 116 may transform the third data including the one or more data types native to GPU 128 into fourth data including one or more data types specific to Java. A data type in the third data corresponds to a data type in the fourth data. Scheduler 116 may perform this transformation for each of the results that scheduler 116 receives.

As discussed, transformation between data that are specific to Java and data that are specific to the GPU may be done via library 140. Scheduler 116 obtains the third data including one or more data types native to GPU 128. Scheduler 116 may transform the third data into fourth data including one or more data types specific to Java by passing the third data to library 140. In an example, library 140 is a Java library that accepts as parameters a data object that is native to GPU 128 and converts the data object to a Java data object. Responsive to passing the third data to library 140, scheduler 116 may obtain the fourth data including the one or more data types specific to Java. A data type in the third data corresponds to a data type in the fourth data. Communications module 118 may send the fourth data to application 104.

As discussed above and further emphasized here, FIG. 1 is merely an example, which should not unduly limit the scope of the claims. In an example, although block diagram 100 is described herein with one application running on computing device 102, other embodiments including more than one application running on computing device 102 are within the scope of this disclosure. Further, each of scheduler 116, compiler (specific to CPU) 112, compiler (specific to GPU) 114, and communications module 118 may be implemented on a computing device that includes a memory and a processor. Further, scheduler 116, compiler (specific to CPU) 112, compiler (specific to GPU) 114, and communications module 118 may be implemented on different computing devices and may be separated by a network. The network may include various configurations and use various protocols including the Internet, World Wide Web, intranets, virtual private networks, wide area networks, local networks, private networks using communication protocols proprietary to one or more companies, Ethernet, WiFi and HTTP, and various combinations of the foregoing.

The processing units may reside in a common computing device or may reside in distributed computing devices. For example, CPU 126 and GPU 128 may reside in different computing devices. In such an example, CPU 126 may send over a network a message including a set of instructions executable on GPU 128 and the one or more data types native to GPU 128. GPU 128 may execute the set of instructions using the one or more data types native to the GPU, and may send a response including a result of the GPU-processed workload to computing device 102.

III. Example Method

Figure 2:
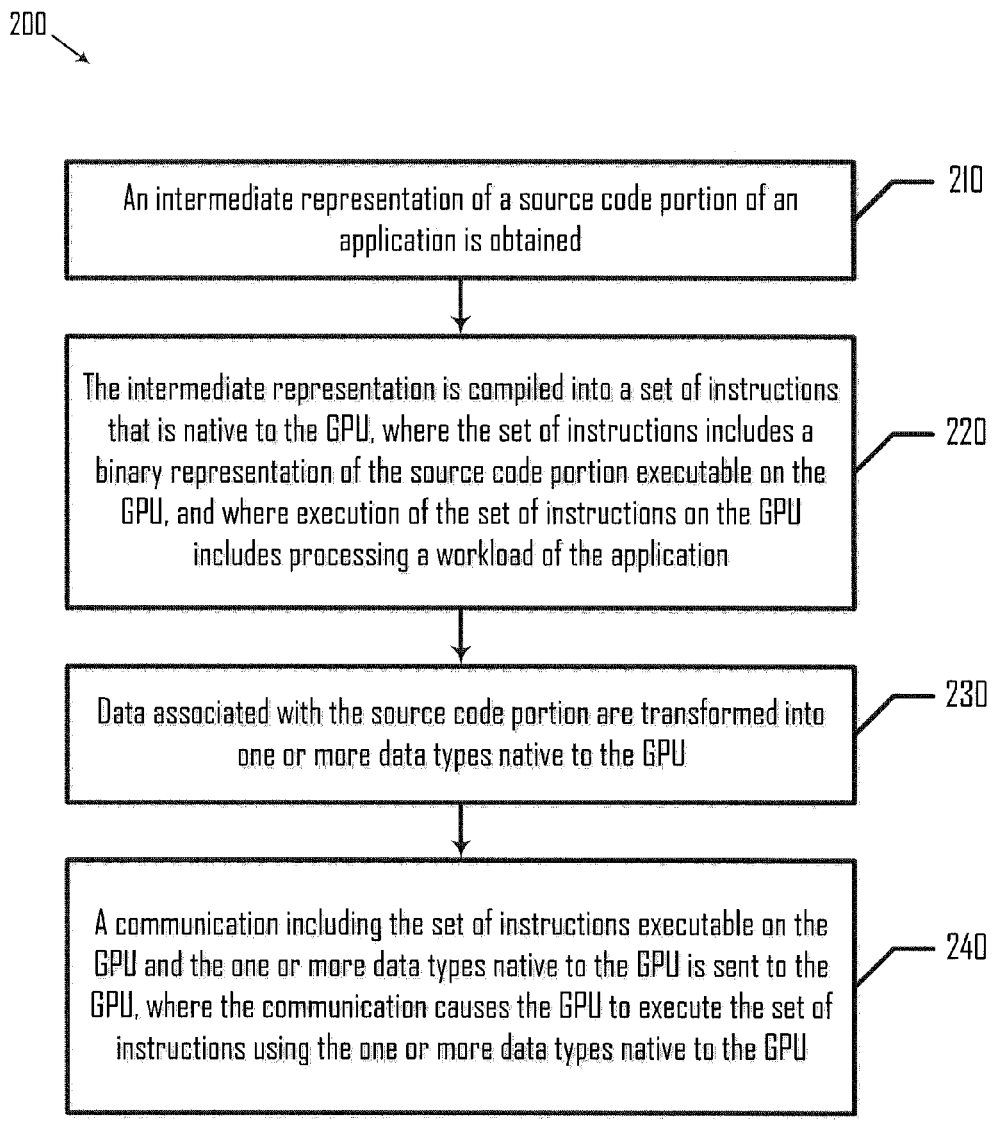
FIG. 2 is a simplified flowchart illustrating a method of distributing a workload of an application to the GPU, according to an embodiment.

FIG. 2 is a simplified flowchart illustrating a method 200 of distributing a workload of an application to a GPU, according to an embodiment. Method 200 is not meant to be limiting and may be used in other applications.

Method 200 includes blocks 210-240. In a block 210, an intermediate representation of a source code portion of an application is obtained. In an example, node 110 obtains intermediate representation 108B of source code portion 104B of application 104. In a block 220, the intermediate representation is compiled into a set of instructions that is native to the GPU, where the set of instructions includes a binary representation of the source code portion executable on the GPU, and where execution of the set of instructions on the GPU includes processing a workload of the application. In an example, compiler (specific to GPU) 114 compiles intermediate representation 108B into a set of instructions that is native to GPU 128, where the set of instructions includes a binary representation of source code portion 104B executable on GPU 128, and where execution of the set of instructions on GPU 128 includes processing a workload of application 104.

In a block 230, data associated with the source code portion are transformed into one or more data types native to the GPU. In an example, scheduler 116 transforms data associated with source code portion 104B into one or more data types native to GPU 128. In a block 240, a communication including the set of instructions executable on the GPU and the one or more data types native to the GPU is sent to the GPU, where the communication causes the GPU to execute the set of instructions using the one or more data types native to the GPU. In an example, communications module 118 sends to GPU 128 a communication including the set of instructions executable on GPU 128 and the one or more data types native to GPU 128, where the communication causes GPU 128 to execute the set of instructions using the one or more data types native to GPU 128.

It is also understood that additional processes may be inserted before, during, or after blocks 210-240 discussed above. It is also understood that one or more of the blocks of method 200 described herein may be omitted, combined, or performed in a different sequence as desired.

IV. Example Computing System

Figure 3:
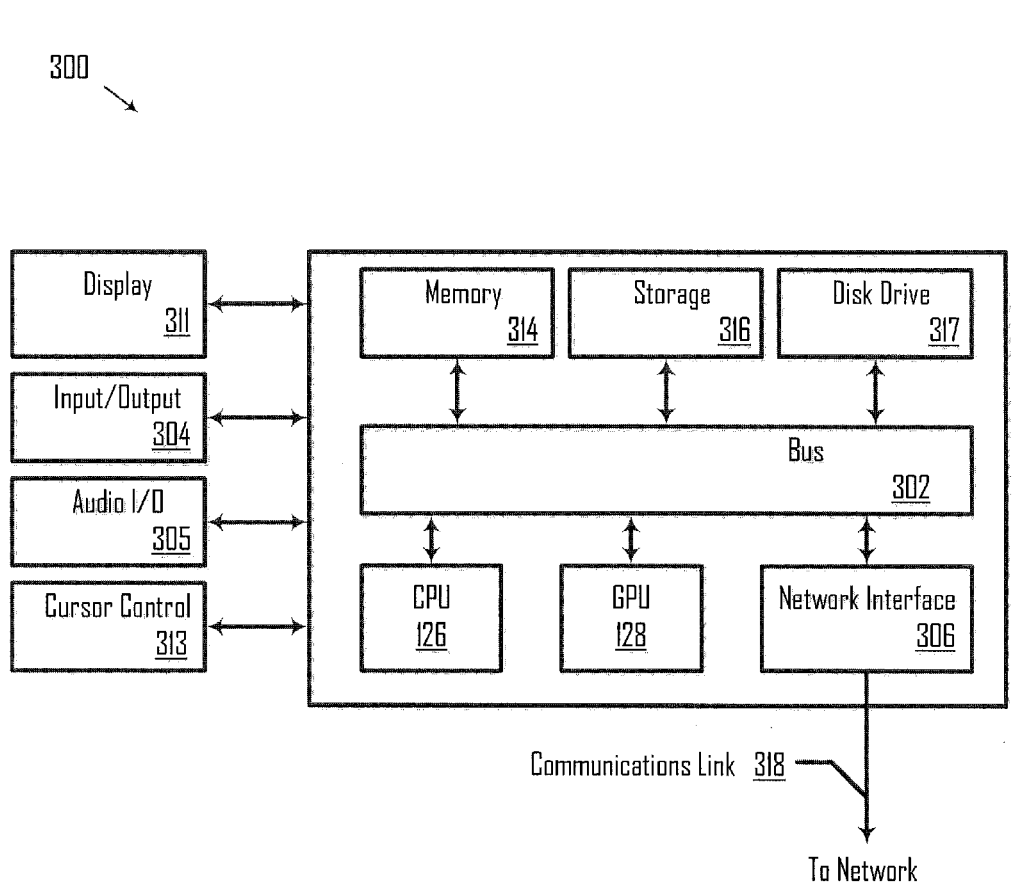
FIG. 3 is a block diagram of a computer system suitable for implementing one or more embodiments of the present disclosure.

FIG. 3 is a block diagram of a computer system 300 suitable for implementing one or more embodiments of the present disclosure. Each of node 110, compiler (specific to CPU) 112, compiler (specific to GPU) 114, communications module 118, and scheduler 116 may execute on a computing device. The computing device may additionally include one or more storage devices each selected from a group including a floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 300 includes a bus 302 or other communication mechanism for communicating information data, signals, and information between various components of computer system 300. A CPU 126, which may be a micro-controller, digital signal processor (DSP), or other processing component, processes these various signals, such as for display on computer system 300 or transmission to other devices (e.g., GPU 128) via communication link 318. CPU 126 may generate a stream of commands to send to GPU 128 via bus 302. Components of computer system 300 also include a system memory component 314 (e.g., RAM), a static storage component 316 (e.g., ROM), and/or a disk drive 317. Computer system 300 performs specific operations by CPU 126 and other components by executing one or more sequences of instructions contained in system memory component 314.

In an example, memory 314 includes a CPU memory space and a GPU memory space. The CPU memory space may be separate from the GPU memory space. In such an example, to enable CPU 126 and GPU 128 to access data stored in the memory space of the other, an application is executed that includes instructions that manually copy data back and forth between the separate memory spaces. In another example, the CPU memory space and GPU memory space are unified memory spaces that relieve the application from including instructions that manually copy data back and forth between the memory spaces. In an example, bus 302 is a PCI bus that delivers data between CPU 126 and GPU 128. Although bus 302 is illustrated as being the path that delivers data between CPU 126 and GPU 128, this is not intended to be limiting and other embodiments using a different mechanism to deliver data between CPU 126 and GPU 128 are within the scope of the disclosure. In an example, an accelerated graphics port (AGP), which is an interface specification, is used to provide a dedicated point-to-point channel so that GPU 128 may directly access memory 314.

Components include an input/output (I/O) component 304 that processes a user action, such as selecting keys from a keypad/keyboard, selecting one or more buttons or links, etc., and sends a corresponding signal to bus 302. I/O component 304 may also include an output component such as a display 311, and an input control such as a cursor control 313 (such as a keyboard, keypad, mouse, etc.). An optional audio input/output component 305 may also be included to allow a user to use voice for inputting information by converting audio signals into information signals. Audio I/O component 305 may allow the user to hear audio. A transceiver or network interface 306 transmits and receives signals between computer system 300 and other devices via a communication link 318 to a network. In an embodiment, the transmission is wireless, although other transmission mediums and methods may also be suitable. In an example, computer system 300 sends a workload of an application to another GPU that is couple to computer system 300 over a network via network interface 306.

Logic may be encoded in a computer readable medium, which may refer to any medium that participates in providing instructions to CPU 126 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 314, and transmission media includes coaxial cables, copper wire, and fiber optics, including wires that include bus 302. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read. In various embodiments of the present disclosure, execution of instruction sequences to practice the present disclosure may be performed by computer system 300. In various other embodiments of the present disclosure, a plurality of computer systems 300 coupled by communication link 318 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various blocks described herein may be changed, combined into composite blocks, and/or separated into sub-blocks to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

We claim:

1. A method of distributing a workload of an application to a graphics processing unit (GPU), comprising:
   identifying an indication that an instantiation of an object-oriented class included in an application is executable on a GPU, wherein a source code portion of the application includes the class and is executable on the GPU, and wherein the indication is included in the application;
   obtaining an intermediate representation of the source code portion of the application, wherein the intermediate representation is machine-independent binary code;
   compiling the intermediate representation into a set of instructions that is native to the GPU, wherein a node provides a runtime environment for the intermediate representation and is executable on a heterogeneous plurality of platforms, the set of instructions includes a binary representation of the source code portion executable on the GPU, and execution of the set of instructions on the GPU includes processing a workload of the application;
   transforming data associated with the types native to the GPU; and
   sending to the GPU a communication including the set of instructions executable on the GPU and the one or more data types native to the GPU, wherein the communication causes the GPU to execute the set of instructions using the one or more data types native to the GPU.

2. The method of claim 1, wherein the application is written in a high-level programming language, and wherein the data associated with the source code portion includes first data including one or more data types specific to the high-level programming language.

3. The method of claim 2, wherein the transforming data includes passing the first data to a library and responsive to the passing, obtaining second data including one or more data types native to the GPU, and wherein a data type in the first data corresponds to a data type in the second data.

4. The method of claim 2, further including:
   responsive to the communication, receiving a response including a result of the GPU-processed workload, wherein the result includes third data including one or more data types native to the GPU;
transforming the third data into fourth data including one or more data types specific to the high-level programming language, wherein a data type in the third data corresponds to a data type in the fourth data; and
sending the fourth data to the application.

5. The method of claim 1, wherein the compiling the intermediate representation into a set of instructions includes generating a stream of commands for execution on the GPU, and wherein the sending includes sending to the GPU the stream of commands.

6. The method of claim 1, wherein the application executes on a computing device that is coupled to a central processing unit (CPU) and the GPU.

7. The method of claim 6, wherein the compiling includes before the application executes on the computing device, compiling the intermediate representation into the binary representation of the source code portion executable on the GPU.

8. The method of claim 6, wherein the compiling includes while the application is executing on the computing device, compiling the intermediate representation into the binary representation of the source code portion executable on the GPU.

9. The method of claim 6, wherein the application is executing on the computing device in parallel with the set of instructions executing on the GPU.

10. The method of claim 9, wherein the data include a first set of data and a second set of data, wherein each of the first and second sets of data includes one or more data types specific to the application, wherein the transforming data includes transforming the one or more data types of the first set of data into one or more data types native to a first GPU and transforming the one or more data types of the second set of data into one or more data types native to a second GPU, and wherein the sending includes sending to the first GPU a first communication including the set of instructions executable on the first GPU and the one or more data types native to the first GPU and sending to the second GPU a second communication including the set of instructions executable on the second GPU and the one or more data types native to the second GPU.

11. The method of claim 10, wherein the first GPU executes the set of instructions using the one or more transformed data types native to the first GPU in parallel with the second GPU executing the set of instructions using the one or more transformed data types native to the second GPU.

12. The method of claim 9, wherein the GPU includes a first GPU core and a second GPU core and the data include a first set of data and a second set of data, wherein each of the first and second sets of data includes one or more data types specific to the application, wherein the transforming data includes transforming the one or more data types of the first data into one or more data types native to the GPU and transforming the one or more data types of the second data into one or more data types native to the GPU, wherein the sending includes sending to the first GPU core a communication including the one or more data types native to the first GPU and sending to the second GPU core a communication including the one or more data types native to the second GPU, and wherein the first GPU cores executes a set of instructions using the one or more data types native to the GPU in parallel with the second GPU core executing a set of instructions using the one or more data types native to the GPU.

13. A system for distributing a workload of an application to a graphics processing unit (GPU), comprising:
a computing device coupled to a plurality of processing units, wherein the plurality of processing units includes a central processing unit (CPU) and a GPU, wherein each of the CPU and GPU executes a workload of an application;
an annotation processor that identifies an indication that an instantiation of an object-oriented class included in an application is executable on a GPU, wherein a source code portion of the application includes the class and is executable on the GPU, and wherein the indication is included in the application;
a scheduler that obtains an intermediate representation of a source code portion of the application, wherein the scheduler transforms data associated with the source code portion into one or more data types native to the GPU; and
a compiler that compiles the intermediate representation into a set of instructions that is native to the GPU, wherein the set of instructions includes a binary representation of the source code portion executable on the GPU, and wherein execution of the set of instructions on the GPU includes processing a workload of the application,
wherein the CPU sends to the GPU the set of instructions executable on the GPU and the one or more data types native to the GPU, and wherein the communication causes the GPU to execute the set of instructions using the one or more data types native to the GPU.

14. The system of claim 13, wherein the application is written in a high-level programming language, and wherein the data associated with the source code portion includes first data including one or more data types specific to the high-level programming language.

15. The system of claim 14, wherein the high-level programming language is Java, a data type specific to the high-level programming language is a Java primitive type, and the intermediate representation of the source code portion is Java bytecode.

16. The system of claim 13, wherein before the application executes on the computing device, the compiler compiles the intermediate representation into the binary representation of the source code portion executable on the GPU, and the scheduler loads the binary representation and sends the binary representation to the CPU.

17. The system of claim 13, wherein after the application starts executing on the computing device, the compiler compiles the intermediate representation into the binary representation of the source code portion executable on the GPU, and wherein the scheduler accesses a library via an application programming interface (API) call including the data associated with the source code portion, and responsive to the API call, the scheduler receives the one or more data types native to the GPU, wherein a data type that is specific to the high-level programming language and included in the API call corresponds to one or more data types native to the GPU.

18. A non-transitory machine-readable medium comprising a plurality of machine-readable instructions that when executed by one or more processors is adapted to cause the one or more processors to perform a method comprising:
identifying an indication that an instantiation of an object-oriented class included in an application is executable on a GPU, wherein a source code portion of the application includes the class and is executable on the GPU, and wherein the indication is included in the application;

obtaining an intermediate representation of a source code portion of an application;

compiling the intermediate representation into a set of instructions that is native to the GPU, wherein the set of instructions includes a binary representation of the source code portion executable on the GPU, and wherein execution of the set of instructions on the GPU includes processing a workload of the application;

transforming data associated with the source code portion into one or more data types native to the GPU; and sending to the GPU a communication including the set of instructions executable on the GPU and the one or more data types native to the GPU, wherein the communication causes the GPU to execute the set of instructions using the one or more data types native to the GPU.

19. The method of claim 1, further including:

obtaining a second intermediate representation of a second source code portion of the application;

compiling the second intermediate representation into a second set of instructions that is native to a central processing unit (CPU), wherein the second set of instructions includes a second binary representation of the second source code portion executable on the CPU, and wherein execution of the second set of instructions on the CPU includes processing a second workload of the application;

transforming data associated with the second source code portion into one or more data types native to the CPU; and sending to the CPU a second communication including the second set of instructions executable on the CPU and the one or more data types native to the CPU, wherein the communication causes the CPU to execute the second set of instructions using the one or more data types native to the CPU, wherein the GPU executes the first set of instructions and the CPU executes the second set of instructions concurrently.

20. The method of claim 1, wherein the application is a Java application, and the indication is an annotation in a Java class definition indicating that the class is executable on the GPU.

* * * * *

UNITED STATES PATENT AND TRADEMARK OFFICE
CERTIFICATE OF CORRECTION

PATENT NO. : 9,632,761 B2  
APPLICATION NO. : 14/153239  
DATED : April 25, 2017  
INVENTOR(S) : Jiri Pechanec and Martin Vecera Page 1 of 1

It is certified that error appears in the above-identified patent and that said Letters Patent is hereby corrected as shown below:

In the Specification

In Column 6, Line 26, please correct "(MK)" to --(JDK)--

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*